J. V. HOFFMAN.
LUBRICATING DEVICE.
APPLICATION FILED MAY 15, 1915.

1,156,779.

Patented Oct. 12, 1915.

Witnesses

Inventor
J. V. Hoffman
By
Attorney

UNITED STATES PATENT OFFICE.

JOHN V. HOFFMAN, OF BELLWOOD, NEBRASKA.

LUBRICATING DEVICE.

1,156,779. Specification of Letters Patent. Patented Oct. 12, 1915.

Application filed May 15, 1915. Serial No. 28,428.

*To all whom it may concern:*

Be it known that I, JOHN V. HOFFMAN, citizen of the United States, residing at Bellwood, in the county of Butler and State of Nebraska, have invented certain new and useful Improvements in Lubricating Devices; and I do hereby declare the following to be a full, clear, and exact description of the invention, such as will enable others skilled in the art to which it appertains to make and use the same.

This invention relates to lubricating devices and the principal object of the invention is to provide a means for controlling the flow of lubricant through various pipes.

Another object of the invention is to provide a means for simultaneously stopping the flow of liquid through the pipe, A further object of the invention is to provide a lubricator wherein the flow of liquid through the pipes is controlled by the size thereof.

With these and other objects in view, the invention consists in the novel combination and arrangement of parts which will be fully set forth in the following specification and accompanying drawings, in which:—

Figure 1:
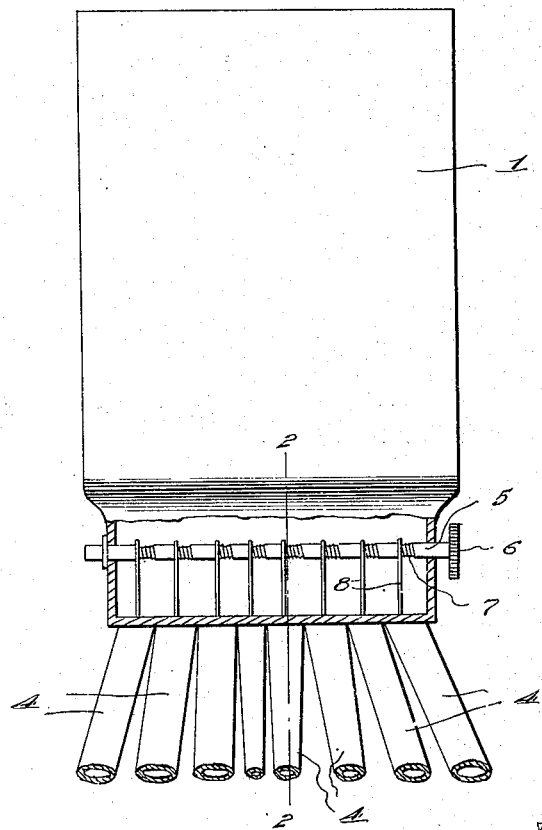
Figure 2:
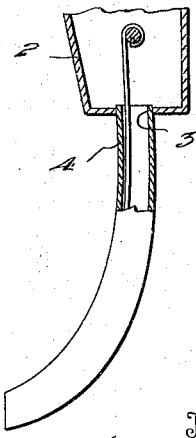
Figure 3:
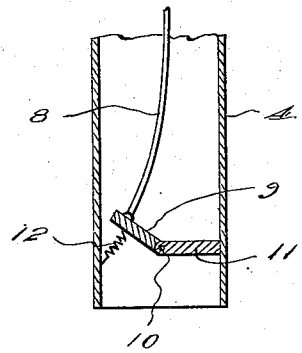
Figure 4:
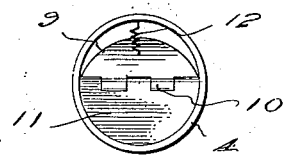

Figure 1 is a view partly in section illustrating a lubricator constructed in accordance with this invention. Fig. 2 is a fragmentary sectional view on line 2—2 of Fig. 1. Fig. 3 is an enlarged fragmentary sectional view of one of the lower ends of one of the lubricating pipes, and Fig. 4 is an end view in elevation of Fig. 3.

Referring now to the drawings by characters of reference, the numeral 1 designates the lubricant reservoir provided with the reduced outlet chamber 2 having its bottom wall provided with a plurality of openings 3. Within these openings are soldered or otherwise secured the upper ends of the lubricant pipes 4 which lead to the various parts of the machine to be lubricated and may be varied in size to feed the proper amount of lubricant. Rotatably mounted in the end walls of the outlet chamber 2 is a suitable shaft 5 provided at one end with the thumb wheel 6 by which the shaft may be rotated. This shaft is provided at spaced intervals with a series of grooves 7 which are arranged spirally and are the size sufficient to receive the wires 8 by which the outlet controlling valves 9 are manipulated. The wires 8 are slidable through the tube 4 and the lower ends thereof are connected to the valves 9 which are pivoted as at 10 to suitable walls 11 secured near the mouths of the pipes. In order to normally hold the valves in their closed position there are provided the springs 12 which are connected to the valves and to the walls of the tube so as to exert pull on the valves to hold the same in parallel relation to the walls 11.

In use it will be apparent that when a machine is started the thumb member 6 is turned so as to wind the wires 8 partly thereon and thus exert pull on the free ends of the valves 9 and lift the same to allow a free passage of the liquid through the pipes. In this way it will be seen that the entire machine may be lubricated simultaneously and as the liquid stands within the pipe 4 at all times to the valve, it will be seen that there is no loss of time in properly lubricating the different parts of the machine, as the lubricant does not have to flow for any great distance until it is delivered to the point where it is to be used. It will thus be seen that considerable time in the starting of machines is saved and the flow of lubricant may be controlled in all pipes simultaneously by the rotation of the shaft 5.

While in the foregoing there has been shown and described the preferred embodiment of this invention, it is to be understood that such changes may be made in the combination and arrangement of parts as will fall within the spirit and scope of the appended claims.

What is claimed is:—

1. A lubricating device of the character described including a reservoir, a plurality of lubricant connecting pipes leading from the reservoir, valves in the lower ends of the pipes, a shaft rotatable within the reservoir and means connected to the valves and arranged to be wound upon the shaft to control the flow of liquid through the pipes.

2. A lubricating device of the character described, a reservoir, pipes connected to the reservoir, and leading therefrom, valves located near the mouths of the pipes, a shaft rotatable in the reservoir, and flexible members connecting the valves with the shaft, whereby when the shaft is rotated the valves will be open.

In testimony whereof I affix my signature in presence of two witnesses.

JOHN V. HOFFMAN.

Witnesses:
JESSE D. BELL,
P. W. McDESMOND.

Copies of this patent may be obtained for five cents each, by addressing the "Commissioner of Patents, Washington, D. C."